United States Patent [19]

Nelson et al.

[11] 4,126,349
[45] Nov. 21, 1978

[54] TRUCK BODY WITH MODULAR CONSTRUCTION

[75] Inventors: Eldrid W. Nelson, Minneapolis; Thomas L. Auth, Shoreview, both of Minn.

[73] Assignees: Chas. Olson & Sons; Wheel Service Co., Inc., both of St. Paul, Minn.

[21] Appl. No.: 754,511

[22] Filed: Dec. 27, 1976

[51] Int. Cl.² ............................................. B62D 33/04
[52] U.S. Cl. ............................ 296/24 R; 224/42.42 R
[58] Field of Search ................... 296/24 R, 28 R, 37, 296/31 R, 31 P; 224/42.42

[56] References Cited

U.S. PATENT DOCUMENTS

| 2,616,754 | 11/1952 | Stahl | 296/27 |
| 2,722,352 | 11/1955 | Dehnel | 224/42.42 |
| 2,973,220 | 2/1961 | White | 296/31 P |
| 3,664,704 | 5/1972 | Ellis | 296/24 R |

Primary Examiner—Philip Goodman
Attorney, Agent, or Firm—H. Dale Palmatier

[57] ABSTRACT

A truck body for a light truck including a frame structure attachable to the truck chassis including invertible joists with offset cantilever ends; truck body side walls each including a plurality of integral one piece molded plastic cabinet modules in tandem fore and aft arrangement with confronting end walls flush against each other and defining socket recesses to receive the offset cantilever ends of the joists; one of the modules on each side having a wheel well asymmetrically located and interchangeable from side to side to accommodate trucks of different cab-to-axle spacings.

10 Claims, 11 Drawing Figures

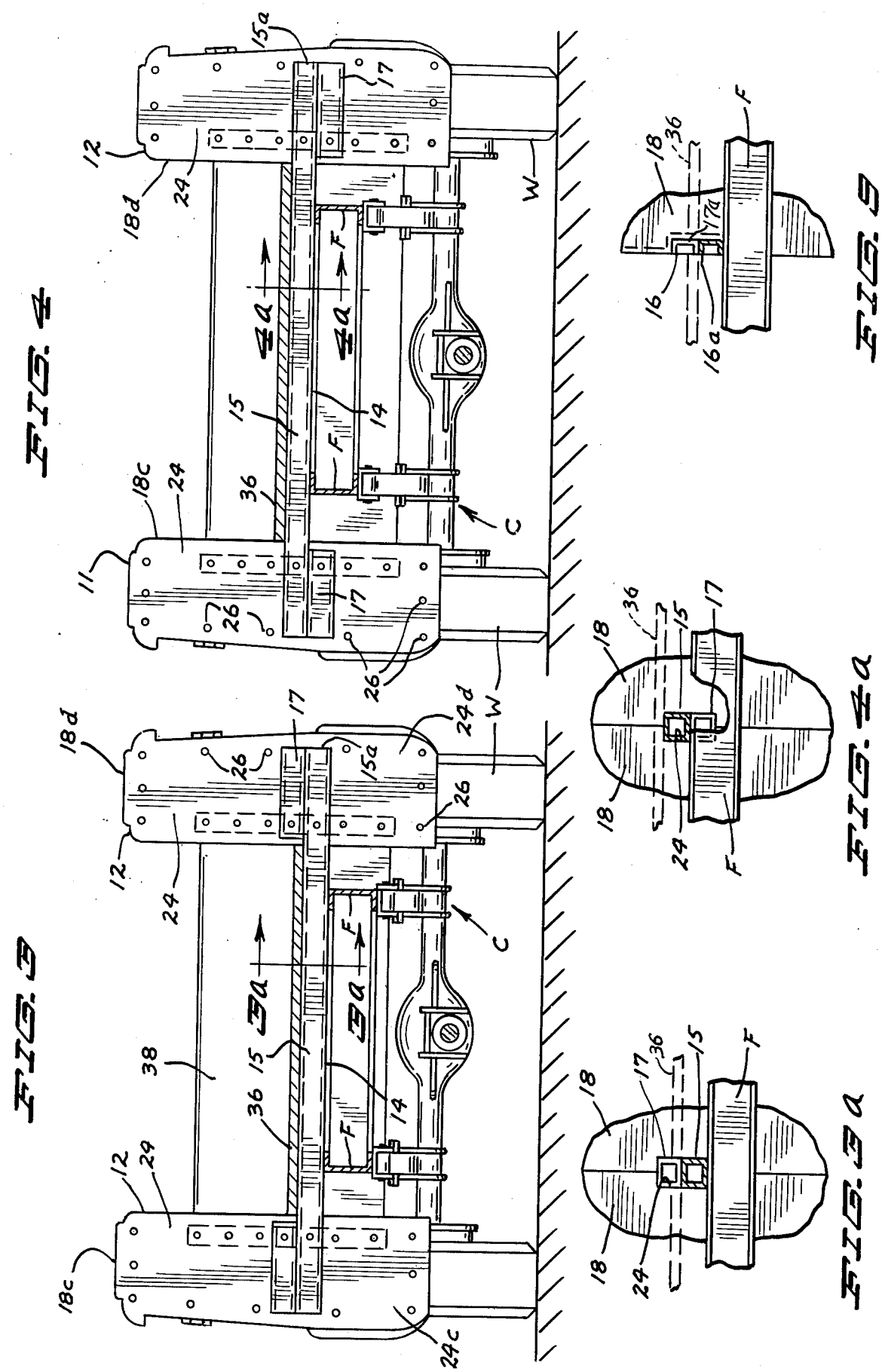

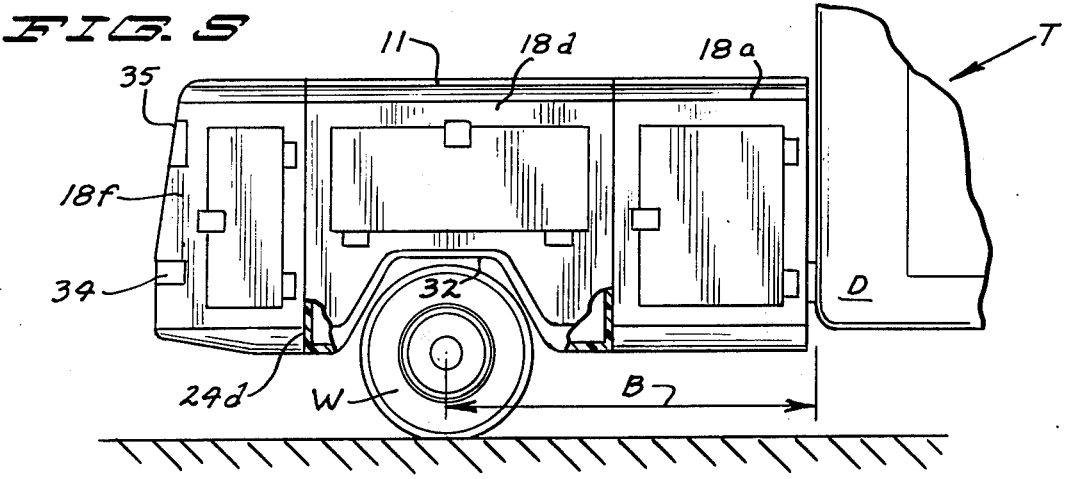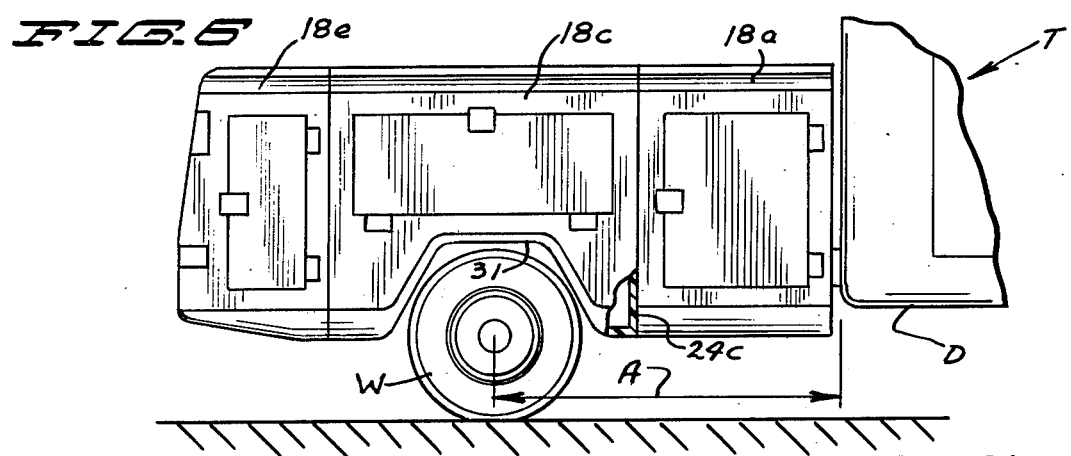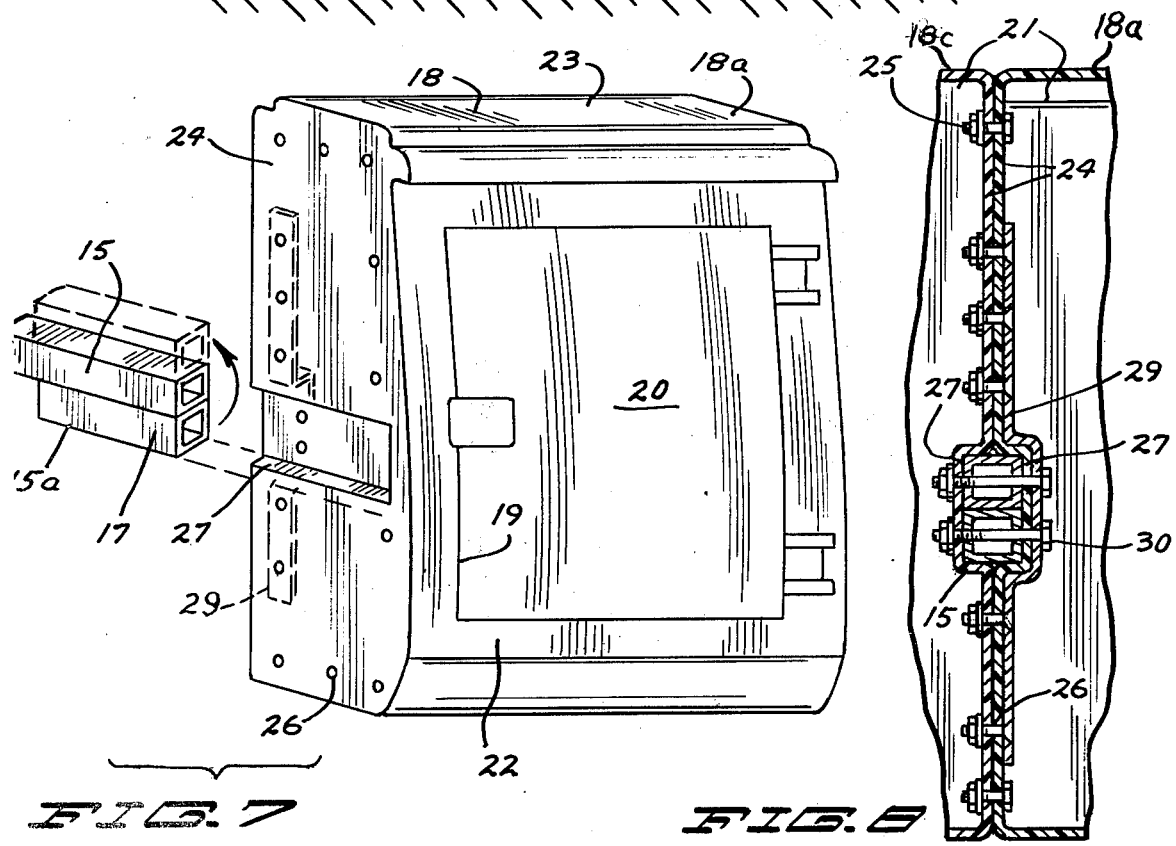

TRUCK BODY WITH MODULAR CONSTRUCTION

This invention relates to truck bodies, and more particularly relates to truck bodies with modular construction.

BACKGROUND OF THE INVENTION

Truck bodies for light trucks which are generally known as half-ton trucks and three-quarter-ton trucks, are generally arranged with multiple compartments so that tools, parts, supplies and other trade articles can be stored and carried in the truck body. In some instances, the truck bodies have been applicable directly to the frame of the truck in a single unitary construction. Representative of such unitary truck body constructions is U.S. Pat. No. 3,068,038 which illustrates longitudinally extending compartments at each side of the truck body and a deck therebetween, all being solid and in one piece; and also the body construction illustrated in U.S. Pat. No. 3,245,713, which is also solidly built and formed in a unitary single piece construction. Typical pickup trucks are also modified to carry cabinets, tool boxes, and tanks. In some instances, these are confined within the box of the pickup truck, as in U.S. Pat. No. 3,664,704; or are suspended from the side walls of the box of the pickup truck as in U.S. Pat. No. 2,722,352; or are mounted on specially constructed track so that the entire cabinet may roll off the truck box as in U.S. Pat. No. 3,826,529. Other unitary truck bodies are integrally formed, but may be separate from the intermediate decking and the cross frame members which overlie the truck frame, so as to be readily transportable for shipping and warehousing; typical of such unitary truck body construction is in U.S. Pat. No. 2,616,754.

Truck bodies have primarily been constructed of steel, but there have been some truck bodies recently constructed of fiberglass; however, because of the integral one piece construction of such truck bodies, any damage to the truck body requires very substantial rebuilding or straightening of the damaged body.

Of course, steel bodies have always had the disadvantage of rusting out under influence of salt and other chemicals applied to roadways to combat snow and ice, and, of course, steel requires constant maintenance by painting or other refinishing.

SUMMARY OF THE INVENTION

The present invention relates to a truck body in modular form, wherein each of the truck body modules is separately mounted and therefore individually replaceable, on the truck frame. The truck body modules are formed of moldable plastic material such as cross-linkable high density polyethylene shaped into a truck body module by rotational molding processes.

At each side of the truck, the body side wall is formed by a plurality of individual upright plastic molded cabinets or modules which are individually mounted and are joined together at end walls which confront and engage each other so that the cabinets in each of the body side walls are in tandem fore and aft arrangement.

In most instances, each of the individual cabinets or modules extends entirely from the top to the bottom of the body side wall. One of the cabinets modules has a wheel well formed into the lower portion thereof and in centered or concentric arrangement with the center of the wheel and axle.

The transverse frame structure to be affixed to the chassis channels of the truck extend transversely across the truck chassis approximately to the outer side of the rear wheels and extend into the body side walls, and are, of course, affixed to the side walls. Accordingly, the side walls of the truck body may be slipped onto or off of the transverse frame structure as may be necessary or desirable.

The confronting end walls of the truck body modules have horizontal recesses formed therein to confront the recesses of the adjacent modules and form sockets receiving the cantilever ends of the adjacent frame structure. As a result, the frame members are in vertical alignment with the vertical end walls of each of the modules to supply adequate physical support for all portions of the integrally molded plastic cabinets.

The truck body is constructed to accommodate trucks of various ground to chassis heights while still maintaining the truck body side walls and compartments therein at approximately uniform heights from the ground. Each of the transverse frame members or joists is formed of a structural channel, and accordingly is readily invertible relative to the truck chassis. Each end of each of the frame members or joists has a similarly shaped filler element affixed thereto to combine with the end of the joist to constitute the insert which extends into the appropriately sized socket in the body side wall in snug fitting relation. The insert will be recognized to be vertically displaceable as the joist is inverted, and accordingly, the body side wall may be adjusted upwardly or downwardly, simply by inverting the joist which vertically displaces the insert.

The truck body side wall also accommodates trucks of varying chassis lengths, which is often expressed in terms of the cab-to-axle spacing. In all of the brands and all of the models of light trucks, there is substantial uniformity in the cab-to-axle spacing, and the spacings are predominately either 56 inches or 60 inches; but it should be understood that in larger sized light trucks the cab-to-axle spacing may be as much as 84 inches.

In each of the truck body side walls, one of the upright cabinets or modules has a wheel well formed in the lower portion thereof. The wheel well is asymmetrically arranged in the module so that the wheel well may be located somewhat forwardly when used in one side wall of the truck body, and if the same module is reversed and placed in the other side wall of the truck body, the wheel well will be located somewhat further rearwardly. Accordingly, the wheel well-defining module, though used with the same identical front module in the side wall, provide adaptation to trucks having varying cab-to-axle spacings.

BRIEF DESCRIPTION OF THE DRAWINGS

FIG. 3 is a detail section view taken approximately at 3—3 in FIG. 2;

FIG. 3a is a detail section view taken approximately at 3a—3a in FIG. 3;

FIG. 4 is a detail section view very similar to FIG. 3, but illustrating an alternate mounting with the same structure;

FIG. 4a is a detail section view taken approximately at 4a—4a in FIG. 4, with portions broken away for clarity of detail;

FIG. 5 is a side elevation view of the truck body applied to a truck with a long cab-to-axle spacing;

FIG. 6 is a side elevation view of the truck body applied to a truck with a short cab-to-axle spacing;

FIG. 7 is a detail perspective view of one of the body modules, together with an appropriately related frame member;

FIG. 8 is an enlarged detail section view taken approximately at 8—8 of FIG. 1;

FIG. 9 is a detail section view taken approximately at 9—9 of FIG. 1.

DETAILED DESCRIPTION OF THE INVENTION

Figure 1:
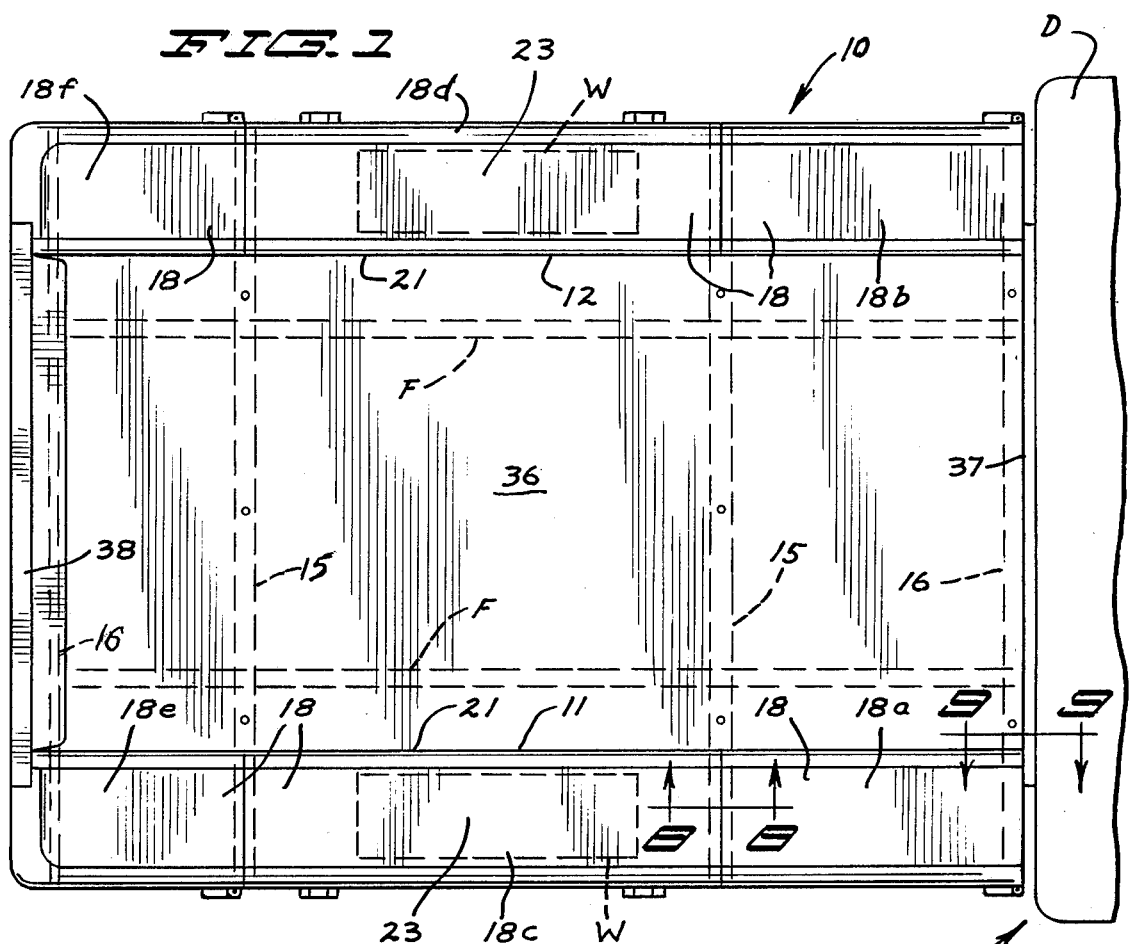
FIG. 1 is a top plan view of the truck body in assembled condition and applied to a light truck.

One form of the invention is illustrated in the drawings and is described herein. The truck body is indicated in general by numeral 10 and is shown mounted upon the chassis C of a light truck T. The chassis C of the truck includes the wheels W and the frame channels F which extend longitudinally throughout substantially the entire length of the truck and are supported from the wheel and axle structures by the springs and other suspension equipment such as shock absorbers. It will be recognized that in different types of light trucks, the frame channels F may be located at different heights from the ground. In a conventional light truck, the frame channels may be spaced from the ground approximately as illustrated in FIG. 3. However, the frame channels F are ordinarily located at a substantially higher location, as illustrated in FIG. 4, in light trucks which incorporate a four-wheel drive. The added ground-to-frame spacing is required because of the clearances needed adjacent the front differential housing through which power is applied to the front wheels.

The truck body 10 includes a pair of elongate and upright body side walls 11 and 12 which are oriented to extend longitudinally of the truck T at opposite sides thereof behind the cab D. The body side walls 11 and 12 are supported from the chassis frame channels F by a supporting structure 14. The support structure 14 can be mounted on the frame channels F in alternate positions so that regardless of the height of the frame channels, the vertical position of the body side walls 11 and 12 can be maintained approximately constant.

It will be recognized that the body side walls 11 and 12 extend both upwardly and downwardly from the height of the top of the frame channels F and from the frame structure 14.

The frame structure comprises a plurality of joists 15 and 16 which have offset ends 15a and 16a which are vertically displaceable as the joists 15 are inverted to accommodate positioning the body side walls 11 and 12 at relatively higher or lower positions. More specifically, the joists 15 are formed of elongate and straight box channels which are essentially square in cross section as illustrated in FIGS. 3 and 7. The joists 16, however, are preferably formed of open channel as compared to the box channel construction of joists 15. Short lengths 17 of box channel and short lengths 17a of open channel are affixed as by welding upon the sides of the box channels of joists 15 and of the open channels of joists 16 and serve as fillers, thus making the height, or width in a vertical direction, of the ends 15a and 16a of the channels 15 and 16 approximately twice the width of the intermediate portion of these channels so that the end portions 15a and 16a are essentially offset as compared to the intermediate portions of the channels. It should be recognized in FIGS. 3 and 4, that the joists 15 may be inverted to vertically displace the offset end portions 15a. The joists are inverted about the longitudinal axes thereof, and from the position illustrated in FIG. 3 to that illustrated in FIG. 4, the joists 15 will be seen to have been inverted so as to essentially lower the offset end portion 15a thereof. The joists 16 are similarly invertible, but are not quite as wide as the box channels used in joists 15.

Each of the side walls 11 and 12 of the truck body 10 includes a plurality of individual modules 18 in the form of cabinets. The individual modules 18 are similarly formed of molded plastic, and it has been found that the modules may be successfully molded by rotational molding with a material known as cross-linkable high-density polyethylene. Each of the modules 18 has an access opening 19 formed therein which is closed by a suitable door 20. Suitable hinges and latches are provided for mounting the doors and releasably retaining them in closed position.

Figure 2:
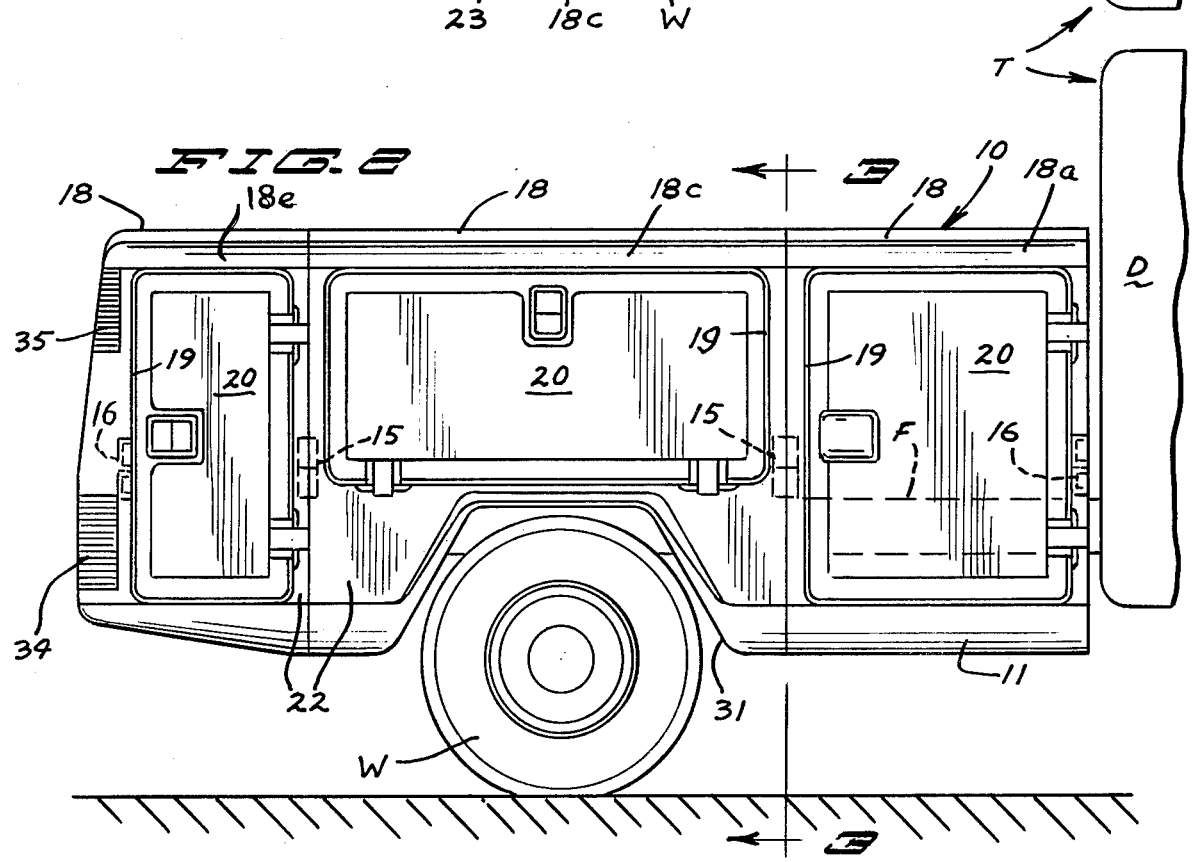
FIG. 2 is a side elevation view.

The modules 18 have back walls 21 which are spaced from each other across the width of the truck body 10, and front walls 22, top walls 23, and end walls 24 which lie transversely of the elongated body side walls 11 and 12. The end walls 24 of adjacent modules 18 lie flush against each other and are secured together by fasteners such as bolts 25 extending through the plurality of aligned apertures 26 in the end walls 24. Each of the end walls 24 also has an elongate horizontally extending recess 27 formed therein and extending through the rear wall 21 thereof to receive the end portion of the adjacent frame member or joist. At the top of each of the recesses 27, there is a ledge which is disposed beneath and in vertical alignment with the side wall 24 and which rests directly upon the joist of the frame structure 14. The recesses 27 in adjoining end walls 24 are located in confronting relation with each other as to define a socket receiving and capturing the end portion of the adjacent joist. As illustrated in FIGS. 2 and 7, the front wall 22 of each of the modules 18 is unbroken adjacent the recess 27 and overlies the end of the recess 27 so that the ends of the joists 15 are not visible from the sides of the truck body 10.

The cantilever end portions of the joists 15 and 16 provide support for the upright end walls 24 of the modules, and, in addition, a metal strap or bar 29 is also provided adjacent each of the joists 15 to give added support to the side wall of the module. The strap or bar 29 is affixed to the side wall by fasteners such as bolts. In addition, the joists 15 are affixed to the end walls 24 at the recesses 27 by clamping fasteners such as bolts 30.

Accordingly, by reason of the manner in which the cantilever end portions of the joists mount the modules 18, the modules extend downwardly from the joists and upwardly from the joists so as to define the entire body side walls 11 and 12 from top to bottom.

Although all of the modules 18 have many similarities as described, and also all have interior compartments or storage chambers which may be sub-divided or provided with shelves upon which tools, supplies and other articles can be stored, the several modules 18 have some differences as will be explained. The modules 18a and 18b are essentially identical with each other, and are located forwardmost in each of the body side walls 11 and 12. Although light trucks may have somewhat different cab-to-axle spacings indicated in FIGS. 5 and 6 by arrows A and B, the same forward modules 18a and 18b may be utilized without difficulty. It is recognized that it may be desirable, under some circumstances, to lengthen the modules 18a and 18b in a direction longitudinally of the body side walls 11 and 12 to accommodate larger utility trucks, but for most half-ton and three-quarter ton light trucks, a single size of module 18a and 18b is suitable.

Modules 18c and 18d have wheel wells 31 and 32, respectively, formed therein. The wheel wells 31 and 32 in the separate modules 18c and 18d, respectively, are located asymmetrically between the two end walls 24 thereof. More specifically, in module 18c, which may be referred to as the right-hand wheel well module, the wheel well 31 will be seen to be located significantly closer to the transverse end wall 24c than to the opposite transverse end wall; and similarly, in the module 18d which may be referred to as the left-hand wheel well module, the wheel well 32 is located significantly closer to the transverse end wall 24d than to the opposite end wall. The outer sides 22 of the left and right-hand modules 18d and 18c are mirror images of each other. As between the two trucks illustrated in FIGS. 5 and 6 wherein the cab-to-axle spacing or dimension is somewhat shorter in FIG. 6 and indicated by the letter A, and is somewhat longer in FIG. 5 and is indicated by the letter B, the wheel well modules 18c and 18d are mounted on the truck body with the module 18c being located in the right-hand body side wall 11 where the cab-to-axle dimension A is somewhat smaller, and in this same condition, the module 18d is utilized in the left-hand body side wall 12 wherein the wheel well 32 is significantly closer to the front end wall 24d.

However, if the cab-to-axle dimension B, somewhat longer, exists in the truck T, then the two modules 18c and 18d are interchanged so that the module 18d is used in the right-hand body side wall 11 as illustrated in FIG. 5 wherein the wheel well 32 is off center to the rear; and similarly in this situation, the module 18c is utilized in the left-hand body side wall 12 so that its wheel well 31 is also off center toward the rear, to accommodate the wheels W.

The rearmost modules 18e and 18f also are set up with left-hand and right-hand orientation and are provided with suitable taillight lenses 34 and 35.

The truck body also incorporates a deck 36 which lies upon and is secured by fasteners such as bolts upon the joists 15. A front panel 37 extends between and is secured as by bolts to the front modules 18a and 18b of the body side walls, and a suitable tailgate 38 is secured and hinged to the rearmost side wall modules 18e and 18f.

It will be recognized that there may be some variation in the individual modules, and they may be provided with various sub-compartments and shelves; however, the several modules 18 extend from top to bottom in the body side walls and make up the entire side walls of the truck body. The modules are mounted on the cantilever ends of the joists or transverse frame members, and, in order to accommodate trucks with chassis frames F of varying heights, the joists 15 may be inverted to vertically displace their offset ends 15a and 16a, thereby mounting the body side walls 11 and 12 and the individual modules 18 at different heights with respect to the chassis frame. In this manner, the body side walls may be maintained approximately at the same height from the ground.

The truck body will accommodate light trucks having various cab-to-axle spacings so that the wheel wells will be properly aligned with the wheels; and this is accomplished by arranging the wheel well modules with the wheel wells in asymmetric position between the front and rear transverse end walls. By interchanging the two modules 18c and 18d, the location of the wheel wells in the body side walls 11 and 12 can be shifted forwardly or rearwardly, as illustrated in FIGS. 5 and 6.

The molded plastic construction of the modules 18 resist corrosion and also resist damage because the polyethylene plastic is relatively resilient. Individual modules may be replaced as requirements change or as unrepairable damage occurs due to accidental impact or the like.

What is claimed is:

1. A truck body for mounting behind the cab, comprising:
   a transverse frame structure to extend crosswise of the longitudinal frame channels of the truck chassis and to extend outwardly to both sides of the truck, and
   a pair of upright body side walls in spaced and back to back relation to each other and affixed to said frame structure to be disposed at opposite sides of the truck, each side wall including
   a pair of individually demountable substantially rigid plastic cabinets each carried on said frame sructure and each being integrally molded in one piece of plastic material and having fore and aft upright end walls at least one of which is in confronting and engaged relation to the end wall of another molded cabinet, said cabinets having a tandem fore and aft arrangement and having means providing access into the storage compartments thereof, and means securing the end walls of adjacent cabinets together.

2. A truck body for mounting behind the cab, comprising
   a tranverse frame structure to extend crosswise of the longitudinal frame channels of the truck chassis and to extend outwardly to both sides of the truck,
   a pair of upright body side walls in spaced and back to back relation of each other and affixed to said frame structure to be disposed at opposite sides of the truck, each side wall including
   a pair of invidually demountable cabinets each carried on said frame structure and each being integrally molded in one piece of plastic material and having fore and aft upright end walls at least one of which is in confronting and engaged relation to the end wall of another molded cabinet, said cabinets having a tandem fore and aft arrangement and having means providing access into the storage compartments thereof, and means securing the end walls of adjacent cabinets together, and each of the body side walls including a plastic molded cabinet with a wheel well formed in the lower portion thereof and between the upright fore and aft end walls thereof.

3. A truck body for mounting behind the cab, comprising
   a transverse frame structure to extend crosswise of the longitudinal frame channels of the truck chassis and to extend outwardly to both sides of the truck, and
   a pair of upright body side walls in spaced and back to back relation to each other and affixed to said frame structure to be disposed at opposite sides of the truck, each side wall including
   a pair of individually demountable cabinets each carried on said frame structure and each being integrally molded in one piece of plastic material and having fore and aft upright end walls at least one of which is in confronting and engaged relation to the end wall of another molded cabinet, said cabinets having a tandem fore and aft arrangement and having means providing access into the storage compartments thereof, and means securing the end walls of adjacent cabinets together, one of the plastic molded plastic cabinets in each of the body side walls having a wheel well formed in the lower portion thereof and between the upright fore and aft end walls thereof, the wheel well in each such cabinet is located asymmetrically between the fore and aft end walls thereof, the outer sides of the body side walls being substantially mirror images of each other, and said cabinets including a pair of identical molded cabinets each disposed in a respective body side wall and located forwardly of the adjacent wheel well-forming cabinet to predetermine the spacing between the truck cab and the center of the wheel well.

4. A truck body for mounting behind the cab, comprising:
a transverse frame structure to extend crosswise of the longitudinal frame channels of the truck chassis and to extend outwardly to both sides of the truck, said frame structure including a plurality of joists extending in such crosswise direction;
a pair of elongate and upright body side walls to extend longitudinally of the truck chassis and arranged in sapced and back-to-back relation to each other to be disposed at opposite sides of the truck, each side wall including
a pair of individually demountable cabinets integrally molded of plastic material and having upright end walls oriented transversely of the truck body side walls, adjoining cabinets in each side wall having a tandem fore and aft arrangement and having adjoining upright end walls lying transversely of the elongate side walls and confronting and engaging each other, the cabinet end walls having elongate and substantially horizontally extending recesses extending substantially across the entire width of the end walls receiving the ends of such joists substantially across the entire width of the end walls therein for supporting the cabinets of said frame structure, and the side wall having means securing adjacent side walls of adjoining cabinets together and securing the end walls to the joists in such recesses.

5. A truck body for mounting behind the cab, comprising:
a transverse frame structure to extend crosswise of the longitudinal frame channels of the truck chassis and to extend outwardly to both sides of the truck, said frame structure including a plurality of joists extending in such crosswise direction;
a pair of elongate and upright body side walls to extend longitudinally of the truck chassis and arranged in spaced and back-to-back relation to each other to be disposed at opposite sides of the truck, each side wall including
a pair of individually demountable cabinets integrally molded of plastic material and having upright end walls oriented transversely of the truck body side walls, adjoining cabinets in each side wall having a tandem fore and aft arrangement and having adjoining upright end walls lying transversely of the elongate side walls and confronting and engaging each other, the cabinet end walls having elongate and substantially horizontally extending recesses receiving the ends of such joists therein for supporting the cabinets on said frame structure, and the side wall having means securing adjacent side walls of adjoining cabinets together and securing the end walls to the joists in such recesses, said joists being invertible and having central portions between the ends thereof invertible about horizontal axes for mounting in either inverted position, both ends of each joist being offset from said axis in the same direction whereby each end of each joist is vertically displaceable upon inverting the joist, whereby to facilitate locating of the body side walls in alternate raised or lowered positions.

6. The truck body according to claim 5 wherein each joist includes a frame member formed straight and linear from end to end, a pair of filler members on the same side of each frame member and respectively located adjacent the opposite ends thereof and cooperating with the opposite ends of the frame member to define the offset ends of the joists.

7. A truck body for mounting behind the cab, comprising:
a transverse frame structure to extend crosswise of the longitudinal frame channels of the truck chassis and outwardly to both sides of the truck, the frame structure including a plurality of spaced and generally parallel joists with both ends offset vertically in the same direction, the joists being invertible about axes extending longitudinally therethrough to vertically displace the offset ends thereof, each of the joists including an elongate linear channel and a pair of fillers on the channel and respectively disposed at opposite ends of the channel and cooperating therewith to define the offset ends of the joists;
a pair of elongate and upright body side walls in widely spaced and parallel and back-to-back relation with each other on said frame structure to be disposed at opposite sides of the truck, each of said body side walls including a plurality of individually demountable modules in the form of cabinets each of which is integrally molded in one piece of plastic material and extends from top to bottom of the body side wall, each of the cabinets having a back wall facing the back walls of the cabinets and the other body side wall and also having a front wall with an access opening therein and a door closing the opening, the cabinets having upright end walls lying transversely of said elongate body side walls and extending from top to bottom thereof, upright end walls of adjoining modules lying against each other in face-to-face relation, said end walls having elongate horizontally extending recesses receiving the offset ends of said joists therein and confronting similar recesses in adjoining end walls of other modules to cooperate therewith in defining joist-receiving sockets facilitating vertical displacement of the body side walls when the joists are inverted, the body side walls having substantially identical modules at the front ends thereof, and also having similar second modules next behind said front module, said second modules having wheel wells in the lower portions thereof, said wheel wells being located asymmetrically between the end walls of said second module to be located concentrically of the wheel axis, said second modules being interchangeable between the two side walls to change the wheel well location in a forwardly and rearwardly direction;

means securing adjoining modules together at their adjoining end walls and also securing the ends of said joists into the recessed end walls of the module; and deck means secured upon said joists between the spaced back-to-back body side walls.

8. A truck body for mounting behind the cab, comprising a transverse frame structure to extend crosswise of the longitudinal frame channels of the truck chassis and to extend outwardly to both sides of the truck, a pair of upright body side walls in spaced and back to back relation to each other and affixed to said frame structure to be disposed at opposite sides of the truck, each side wall including a pair of individually demountable and substantially rigid plastic cabinets each being integrally molded in one piece of plastic material and having a back wall and also having fore and aft upright end walls, one of which is in confronting and engaged relation to the end wall of another molded cabinet, each of the cabinets having an elongate ledge beneath and in substantial vertical alignment with one of said walls and being supported upon said frame structure, said cabinets having means retaining said ledge upon the frame structure and having a tandem fore and aft arrangement and also having means providing access into the storage compartments thereof and means securing the end walls of adjacent cabinets together.

9. A truck body for mounting behind the cab, comprising a transverse frame structure to extend crosswise of the longitudinal frame channels of the truck chassis and to extend outwardly to both sides of the truck, a pair of upright body side walls in spaced and back to back relation to each other and affixed to said frame structure to be disposed at opposite sides of the truck, each side wall including a pair of individually demountable substantially rigid plastic cabinets each being integrally molded in one piece of plastic material and having fore and aft upright end walls, one of which is in confronting and engaged relation to the end wall of another molded cabinet, each cabinet having a pair of ledges respectively underlying substantially the entire width of respective fore and aft end walls and resting upon said frame structure also extending across substantially the entire width of said fore and aft end walls to minimize the likelihood of inward and outward tilting of the cabinets and body side walls relative to the frame structure, the cabinets having means secured to the frame structure and retaining said ledges in supported relation upon the frame structure, and said cabinets having a tandem fore and aft arrangement and having means providing access into the storage compartments thereof, and means securing the walls of adjacent cabinets together.

10. The truck body according to claim 9 and said cabinet ledges and frame structure having cooperating means interchangeably mounting the cabinets in either of two vertical positions relative to the frame of the truck.

* * * * *

UNITED STATES PATENT AND TRADEMARK OFFICE
CERTIFICATE OF CORRECTION

PATENT NO. : 4,126,349
DATED : November 21, 1978
INVENTOR(S) : Eldrid W. Nelson and Thomas L. Auth It is certified that error appears in the above-identified patent and that said Letters Patent are hereby corrected as shown below:

In claim 2, column 6, line 40, after "relation", delete "of" and insert --to--.

In claim 4, column 7, line 46, after "cabinets", delete "of" and insert --on--.

In claim 7, column 9, line 1, delete "axis" and insert --axles--.

Signed and Sealed this

First Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,126,349

DATED : November 21, 1978

INVENTOR(S) : Eldrid W. Nelson; Thomas L. Auth

It is certified that error appears in the above-identified patent and that said Letters Patent are hereby corrected as shown below:

On cover page, after "Assignees:", delete "Chas. Olson & Sons; Wheel Service Co., Inc.," and substitute --Chas. Olson & Sons and Wheel Service Co., Inc.,--

Signed and Sealed this

Eighth Day of June 1982

|SEAL|

*Attest:*

*Attesting Officer*

GERALD J. MOSSINGHOFF

*Commissioner of Patents and Trademarks*